(12) United States Patent
Krueger et al.

(10) Patent No.: US 7,968,478 B2
(45) Date of Patent: Jun. 28, 2011

(54) CONTINUOUS CROSS-PLIED MATERIAL AND METHOD OF MANUFACTURING SAME

(76) Inventors: Ronald G. Krueger, New Braunfels, TX (US); Ronald L. Krueger, New Braunfels, TX (US)

( * ) Notice: Subject to any disclaimer, the term of this patent is extended or adjusted under 35 U.S.C. 154(b) by 0 days.

(21) Appl. No.: 12/586,183

(22) Filed: Sep. 18, 2009

(65) Prior Publication Data

US 2011/0070395 A1    Mar. 24, 2011

(51) Int. Cl.
*B32B 27/04*    (2006.01)

(52) U.S. Cl. ............ 442/135; 156/60; 156/166; 442/134

(58) Field of Classification Search .................. 442/134, 442/135; 2/2.5; 89/36.01, 36.02, 36.05; 428/105, 911; 156/60, 166
See application file for complete search history.

(56) References Cited

U.S. PATENT DOCUMENTS 5,547,536 A * 8/1996 Park ............................. 156/292

\* cited by examiner

*Primary Examiner* — Arti Singh-Pandey
(74) *Attorney, Agent, or Firm* — Charles J. Rupnick, Attorney at Law

(57) ABSTRACT

A novel cross-plied material is formed of portions of a ply of a ballistic-resistant structure composed of unidirectionally-oriented bundles of high strength filaments laminated between opposing thermoplastic films which portions are cross-plied with portions of a continuous ply of a similar ballistic-resistant structure with a plurality of yarns laterally spaced into a linear array corresponding to the width of the continuous ply along the ply direction. Substantially continuous coatings or deposits of a bonding or coupling agent on the yarns cause a plurality of substantially continuous bonding strips to be formed between the continuous ply and the portions of cross-ply, with the bonding strips being laid in a laterally spaced linear array corresponding to the yarns. The bonding strips couple the cross-ply portions with consecutive portions of the continuous ply, whereby the continuous ply and the cross-ply portions are adhered sufficiently to prevent their being pulled apart.

21 Claims, 4 Drawing Sheets

CONTINUOUS CROSS-PLIED MATERIAL AND METHOD OF MANUFACTURING SAME

FIELD OF THE INVENTION

The present invention relates to method and apparatus for the continuous, automatic production of cross-plied material, preferably for structural or anti-ballistic end uses and preferably for supply in roll form, i.e., like a bolt of cloth, for subsequent processing or use. The present invention also relates to a cross-plied material, especially in rolls, made in accordance with the method and which can be ballistic resistant.

A "ply" is one layer of material, and a "cross-ply" or "cross-plied material" is a construction of two or more layers of material which are superimposed with the axes of adjacent layers rotated relative to one another.

BACKGROUND OF THE INVENTION

Unidirectional fiber materials are used in ballistic-resistant structures and are disclosed, e.g., in U.S. Pat. Nos. 4,916,000; 4,079,161; 4,309,487 and 4,213,812. A non-woven ballistic-resistant laminate is disclosed in U.S. patent application Ser. No. 11/986,624 filed in the names of Ronald G. Krueger, Ronald L. Krueger, and Chris A. Yancy on Nov. 21, 2007, the complete disclosure of which is incorporated herein by reference. The laminate structure is used in soft body armor to protect the wearer against high-velocity bullets and fragments. The non-woven ballistic-resistant laminate is made by first forming a non-woven unidirectional tape, which is composed of a bundle of unidirectional polyethylene or other high strength filaments fibers and an elastic resin material that holds the fibers together. A layer, or array, of the unidirectionally-oriented bundles of high strength filaments is then laminated together between polyethylene, polypropylene or other thermoplastic films to form the ballistic-resistant laminate assembly or panel. The thermoplastic film retains the filament bundles in the array. The film also prevents adjacent panels from sticking together when the panels are layered in the soft body armor. The individual ballistic-resistant panels are layered in a cross-plied manner, with alternate panels having their arrays of filament bundles crosswise to those of adjacent panels, to meet structural requirements of ballistic-resistant body armor, such as impact force distribution.

However, known ballistic-resistant laminates are limited in their ability to provide a satisfactory light weight and flexible ballistic-resistant body armor structure.

U.S. Pat. No. 5,173,138, issued Dec. 22, 1992, the complete disclosure of which is incorporated herein by reference, teaches a method and apparatus for the automated production of a cross-plied material, preferably for structural or anti-ballistics end use. Here, the plies comprise unidirectional fibers in a resin system and carrier webs of release paper. The apparatus includes means for advancing a first, continuous ply of material into a cross-plying zone; means for sequentially laying a plurality of discontinuous second plies of material coplanarly on the first ply in the cross-plying zone with the longitudinal axis of each of the second plies rotated relative to the longitudinal axis of the first ply; means for preconsolidating the continuous first and consecutive second plies; and means for withdrawing the cross-piled material from the cross-plying zone. The method features the steps of advancing the first ply of material into a cross-plying zone; sequentially laying the second plies of material coplanarly on the first ply in the cross-plying zone with the longitudinal axis of each of the second plies rotated relative to the longitudinal axis of the first ply; preconsolidating the first and the second plies; withdrawing the cross-piled material from the cross-plying zone; and separating the cross-plied material from the carrier webs. The cross-piled material produced can be rolled up in a bolt with a polyethylene or other interleaf film that functions as a release boundary layer to the cross-plied material, for subsequent processing or use.

The present invention method and apparatus for the automated production of a cross-plied material that achieves greater flexibility than material manufactured according to the teachings of U.S. Pat. No. 5,173,138.

SUMMARY OF THE INVENTION

The present invention is a novel cross-plied material is formed of portions of a ply of a ballistic-resistant laminate structure composed of unidirectionally-oriented bundles of high strength filaments laminated between opposing thermoplastic films which portions are cross-plied with portions of a continuous ply of a similar ballistic-resistant laminate structure with a plurality of yarns laterally spaced into a linear array corresponding to the width of the continuous ply along the ply direction. Substantially continuous coatings or deposits of a bonding or coupling agent on the yarns cause a plurality of substantially continuous bonding strips to be formed between the continuous ply and the portions of cross-ply, with the bonding strips being laid in a laterally spaced into a linear array corresponding to the yarns. The bonding strips couple the cross-ply portions with the continuous ply, whereby the continuous ply and the cross-ply portions are adhered sufficiently to prevent their being pulled apart.

According to one aspect of the invention an automated cross-ply machine is disclosed for automatically forming a continuous roll of the cross-plied material.

According to another aspect of the invention a method is disclosed for automatically forming the continuous roll of the cross-plied material, for example but not limited to utilizing the machine disclosed herein.

Other aspects of the invention are detailed herein, including methods for making the ballistic-resistant laminate structure.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF PREFERRED EMBODIMENT

In the Figures, like numerals indicate like elements.

Unidirectional high performance fiber materials composed, for example, of unidirectional polyethylene fibers, are well known as disclosed in the prior art by U.S. Pat. Nos. 4,916,000; 4,079,161; 4,309,487 and 4,213,812, which are incorporated in entirety herein by reference. Such high performance fiber materials are also known to be formed into composite ballistic-resistant structures as disclosed, for example, in U.S. Pat. Nos. 6,846,548 and 7,211,291, which are incorporated in entirety herein by reference. Alternatively, non-woven ballistic-resistant laminates are manufactured without resins as disclosed, for example, in U.S. Pat. Nos. 5,437,905; 5,443,882; 5,443,883 and 5,547,536, which are incorporated in entirety herein by reference.

The present invention will be understood by those skilled in the art by reference to the accompanying figures wherein like numbers refer to like apparatus. The present invention is a method and apparatus for the continuous, automatic production of a continuous cross-plied material 10.

Figure 1:
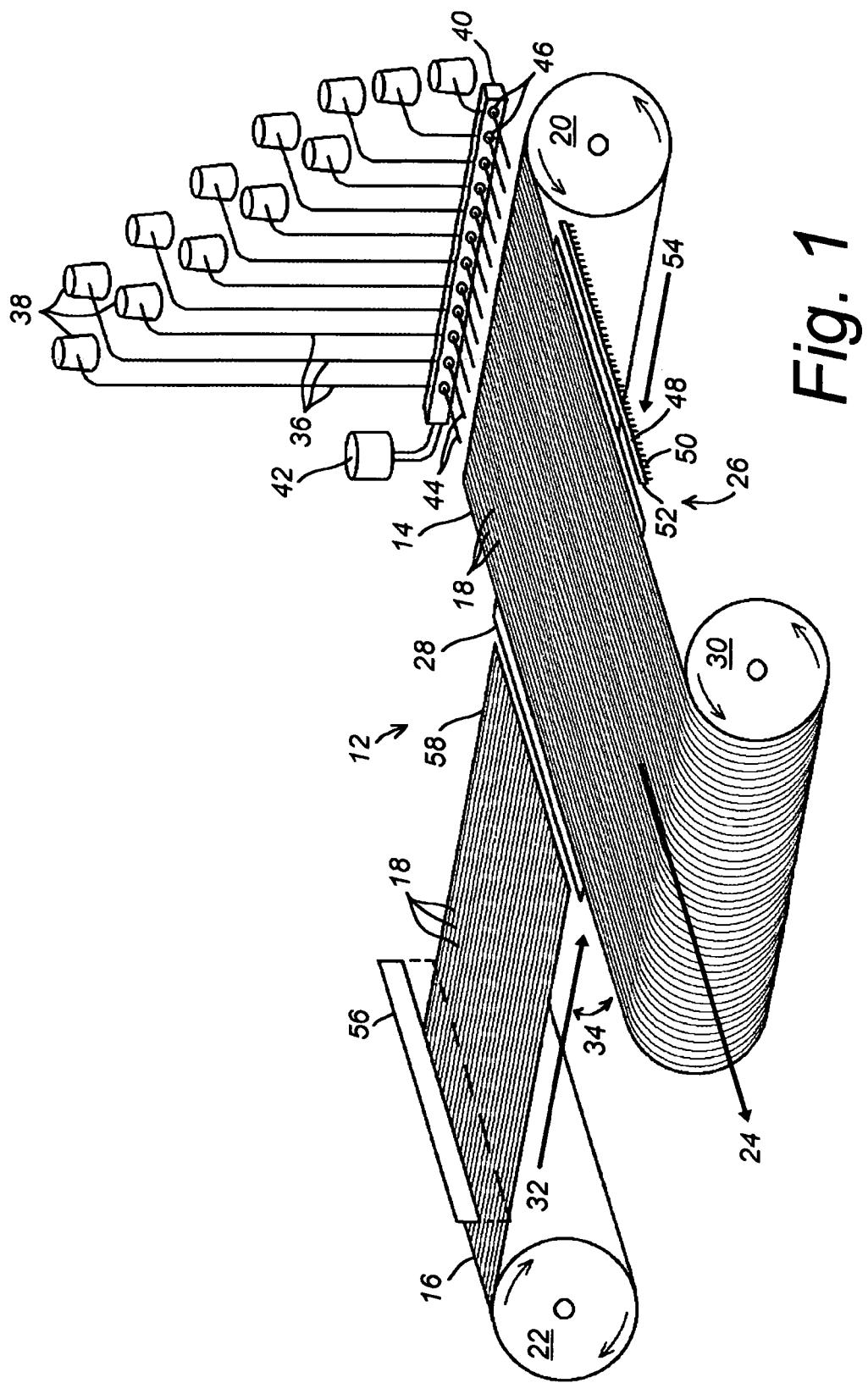
FIG. 1 illustrates by example and without limitation the general structure of a novel automated cross-ply machine for automatically forming a continuous roll of cross-plied material.

FIG. 1 illustrates the general structure of an automated cross-ply machine 12 for automatically forming a continuous roll of the cross-plied material 10. In the Figures, plies 14 and 16 are each plies of high performance fiber materials 18, for example but not limited to unidirectional high performance fiber materials composed of unidirectional polyethylene fibers, laminated between opposing polyethylene, polypropylene or other thermoplastic films. Plies 14, 16 are provided on respective supply rolls 20 and 22. Ply 14 is continuously advanced from let off roll 20 in a first 0 degree ply direction (arrow 24) into a cross-ply section 26 of a cross-ply machine 12. Continuous ply 14 is intermittently advanced along the ply advancing direction (arrow 24) into the cross-ply section 26 over a substantially planar support surface 28 and onto a take-up beam 30.

Ply 16 is arranged for being advanced along a second cross-ply direction (arrow 32) into the cross-ply section 26 and over the support surface 28 of the cross-ply machine 12. Cross-ply direction (arrow 32) of ply 16 is oriented at any desired cross-ply angle 34 to the ply advancing direction (arrow 24) of ply 14 and is optionally oriented crosswise of continuous ply 14 at about 90 degrees, a 0/90 cross-plied relationship according to common usage.

A plurality of yarns 36 may be supplied from separate creeled yarn packages 38, as shown here, or may be supplied from a warp beam (not shown). The yarns 36 are optionally composed of unidirectional high performance fiber materials composed of unidirectional polyethylene fibers, but are not limited to such high performance fiber materials. Alternatively, the yarns 36 are composed of a different fiber material. The yarns 36 are supplied to a coupling agent applicator 40 where a coupling agent 42 is applied to the yarns 36.

The coupling agent applicator 40 is any device capable of applying substantially continuous coatings or deposits 44 of the coupling agent 42, including any anchoring, bonding or adhering agent, onto exposed surfaces of the yarns 36. Applications of these polymeric anchoring, bonding or adhering agent materials 42 may be accomplished by any suitable method. By example and without limitation, the coupling agent applicator 40 is a spraying applicator and applying substantially continuous deposits 44 of coupling agent 42 is accomplished by spraying an aerosol. Else, the step of applying the deposits 44 of coupling agent 42 is accomplished by atomizing and spraying a liquid using a spraying applicator 40. Alternatively, the step of applying the deposits 44 of coupling agent 42 is accomplished by wiping a gel or liquid, or painting as with a brush or other coupling agent mass applicator 40. The coupling agent applicator 40 is, by example and without limitation, a tank wherein the yarns 36 are at least substantially coated, or optionally impregnated, with the coupling agent 42.

The coupling agent 42 at least substantially coats the outer surface of the yarns 36, but the coupling agent 42 may optionally penetrate into and impregnate the yarns 36 without substantially affecting the invention. Such penetration of the coupling agent 42 into the yarns 36 is also contemplated and may be included without deviating from the scope and intent of the present invention.

The coupling agent 42 is any anchoring, bonding or other adhering agent of a type compatible with the polyethylene, polypropylene or other thermoplastic films on the outside of the laminated plies 14, 16 and capable of adhering to the films for coupling together the laminated plies 14, 16. By example and without limitation, coupling agent 42 is selected from the group of anchoring, bonding or adhering agents consisting of: an adhesive agent, and a polymeric agent. For example, when the films on the outside of the laminated plies 14, 16 are thermoplastic or other polymeric films, and the coupling agent 42 is a compatible polymeric material. The coupling agent 42 may be a polymeric latex that is bonded with the application of heat and/or pressure.

Any suitable elastomeric material may be used for the anchoring, bonding or adhering agent materials 42. Representative examples of suitable elastomers of the elastomeric material have their structures, properties, and formulations together with cross-linking procedures summarized in the Encyclopedia of Polymer Science, Volume 5, "Elastomers-Synthetic" (John Wiley and Sons Inc., 1964). For example, any of the following materials may be employed: polybutadiene, polyisoprene, natural rubber, ethylene-propylene copolymers, ethylenepropylenediene terpolymers, polysulfide polymers, polyurethane elastomers, chlorosulfonated polyethylene, polychloroprene, plasticized polyvinylchloride using dioctyl phthalate or other plasticers well known in the art, butadiene acrylonitrile elastomers, poly(isobutylene-co-isoprene), polyacrylates, polyesters, polyethers, fluoroelastomers, silicone elastomers, thermoplastic elastomers, copolymers of ethylene. Useful elastomers are block copolymers of conjugated dienes and vinyl aromatic monomers, including but not limited to, butadiene and isoprorene. Useful conjugated aromatic monomers, include but are not limited to, styrene, vinyl toluene and t-butyl styrene. Block copolymers incorporating polyisoprene may be hydrogenated to produce thermoplastic elastomers having saturated hydrocarbon elastomer segments. The polymers may be simple tri-block copolymers of the type A-B-A, multi-block copolymers of the type (AB)n(n=2 10) or radial configuration copolymers of the type R-(BA).times.(x=3 150): wherein A is a block from a polyvinyl aromatic monomer and B is a block from a conjugated diene elastomer. Many of these polymers are produced commercially by the Shell Chemical Co. and described in the bulletin "Kraton Thermoplastic Rubber", SC-68-81.

Low modulus elastomeric anchoring, bonding or adhering agent materials 42 may also include fillers such as carbon black, silica, glass micro-balloons, etc., and may be extended with oils and vulcanized by sulfur, peroxide, metal oxide, or radiation cure systems using methods well known to rubber technologists of ordinary skill. Blends of different elastomeric materials may be used together or one or more elastomeric materials may be blended with one or more thermoplastics. High density, low density, and linear low density polyethylene may be cross-linked to obtain a material of appropriate properties, either alone or as blends.

The proportion (volume percent) of polymeric or other anchoring, bonding or adhering agent materials 42 to the yarns 36 varies according to the rigidity, shape, heat resistance, wear resistance, flammability resistance and other properties desired. Other factors that affect these properties include the spatial density of the anchoring, bonding or adhering agent materials 42, void percentage within the yarns 36, and other such variables related to the placement, size, shape, positioning and composition of the anchoring, bonding or adhering agent materials 42 and arrayed yarns 36.

According to one embodiment, the coupling agent 42 is a conventional pressure sensitive adhesive, or PSA, of a type which forms a bond when pressure is applied to marry the adhesive with the adhered. No solvent, water, or heat is needed to activate the adhesive. It is commonly used in pressure sensitive tapes, labels, note pads, automobile trim, and a wide variety of other products. As the name "pressure sensitive" indicates, the degree of bond is influenced by the amount of pressure which is used to apply the adhesive to the surface. Surface factors such as smoothness, surface energy, removal of contaminants, etc. are also important to proper bonding. PSAs are usually designed to form a bond and hold properly at room temperatures. PSAs typically reduce or lose their tack at cold temperatures and reduce their shear holding ability at high temperatures: Specialty adhesives are made to function at high or low temperatures.

A plurality of guides 46 is provided for guiding the continuous yarns 36 into appropriate positions for application to the continuous ply 14 as it is pulled off of supply roll 20 and wound onto the take-up beam 30. Guides 46 may be situated between the coupling agent applicator 40 and the supply roll 20 of ply 14, as illustrated. Alternatively, relative positions of the coupling agent applicator 40 and the guides 46 may be reversed, with the coupling agent applicator 40 being situated between the guides 46 and the supply roll 20 of ply 14. As illustrated here, the guides 46 are optionally combined with the coupling agent applicator 40 in a single unit.

Additionally, a contactor 48 is provided for promoting contact between plies 14, 16. For example, contactor 48 includes a plurality of contact promoters 50, e.g., sponges or brushes, and is situated for urging cross-plied ply 16 into contact with continuous ply 14 over the support surface 28 in the cross-ply section 26 of cross-ply machine 12.

As illustrated here by example and without limitation, the contactor 48 is a bar 52 having a plurality of the brush or sponge contact promoters 50 extended therefrom. The bar 52 of contactor 48 is adapted for being advanced over the cross-plied plies 14, 16 opposite from the support surface 28 in the cross-ply section 26 of cross-ply machine 12 with the brush contact promoters 50 adjacent to the support surface 28. Here, contactor 48 is illustrated by example and without limitation as being advanced over the cross-plied plies 14, 16 in a sweep direction (arrow 54) crosswise of the ply 14 and its ply advancing direction (arrow 24). However, the advancing sweep direction (arrow 54) of the contactor 48 is optionally substantially aligned with the ply advancing direction (arrow 24) of the ply 14, or another convenient orientation without deviating from the scope and intent of the present invention.

A cutter 56 is provided for cutting portions 58 of cross-ply 16 substantially equal to the width of continuous ply 14 as measured along the cross-ply direction (arrow 32). The cutter 56 is advanced through the cross-ply 16 (phantom lines) for cutting portions 58.

Figure 2:
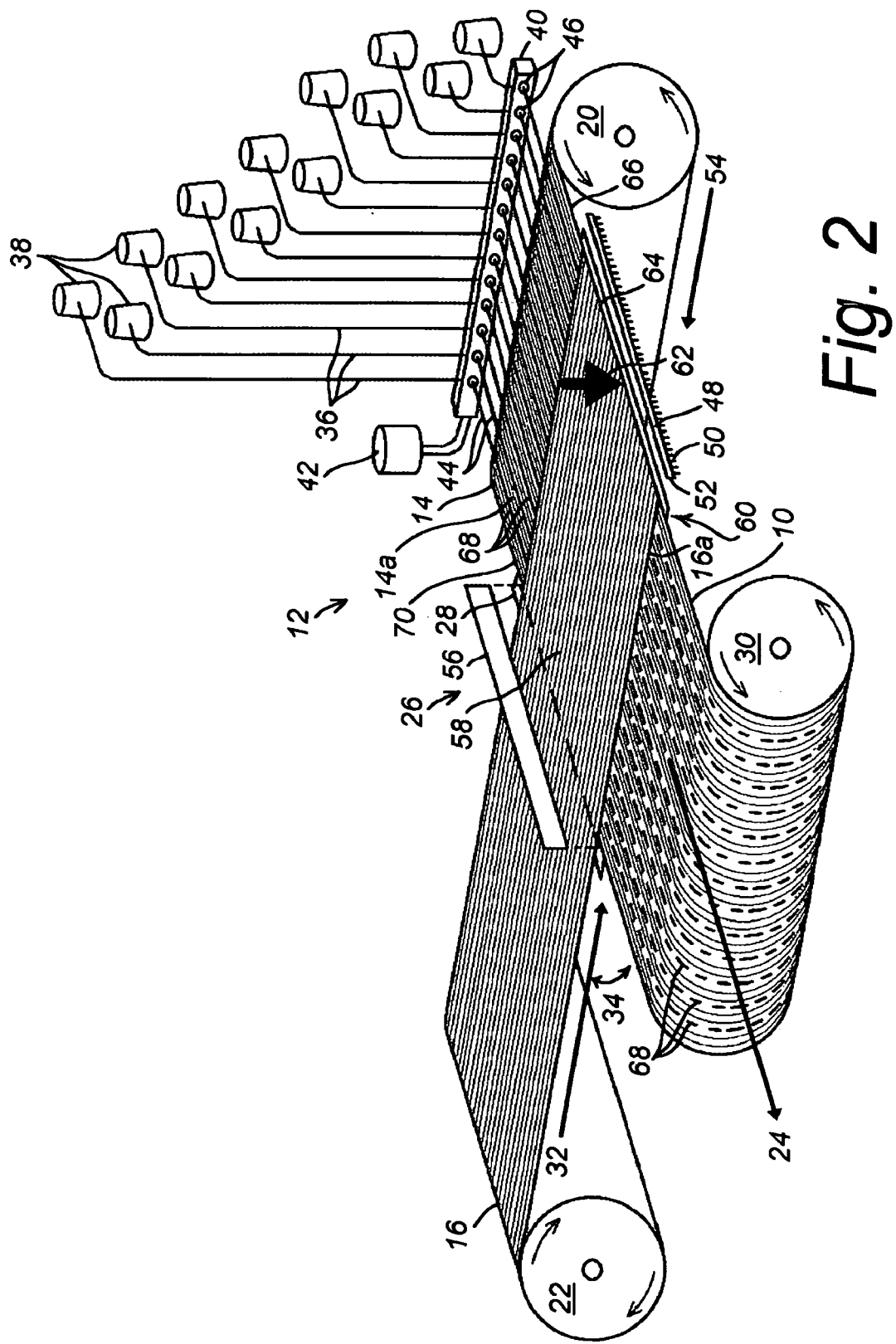
FIG. 2 illustrates one embodiment of a method of the invention wherein portions of a ply of a ballistic-resistant structure composed of unidirectionally-oriented bundles of high strength filaments laminated between opposing films of polyethylene, polypropylene or other thermoplastic material are cross-plied with portions of a continuous ply of a similar ballistic-resistant structure with a plurality of substantially continuous bonding strips laterally spaced into a linear array corresponding to a width of the continuous ply along the ply direction.

FIG. 2 illustrates one embodiment of the invention wherein portions 58 of cross-ply 16 are substantially continuously cross-plied with portions 60 of continuous ply 14. Continuous ply 14 is advanced along the ply advancing direction (arrow 24) into the cross-ply section 26 of cross-ply machine 12. Continuous ply 14 is intermittently stopped in the cross-ply section 26 over support surface 28. Cross-ply 16 is advanced along the cross-ply advancing direction (arrow 32) into the cross-ply section 26 of cross-ply machine 12 over continuous ply 14 and support surface 28.

Continuous yarns 36 having thereon substantially continuous coatings or deposits 44 of coupling agent 42 are drawn into contact with the outer surface of one of the films laminated with high performance fibers 18. Guides 46 separate the plurality of yarns 36 into a continuous linearly spaced array corresponding to the width of ply 14 along the ply advancing direction (arrow 24). Thereafter, the yarns 36 are individually guided by guides 46 as they advance continuously along the ply advancing direction (arrow 24) in connection with continuous ply 14.

Cross-ply 16 is oriented at cross-ply angle 34 to the ply advancing direction (arrow 24) of continuous ply 14, for example, crosswise about 90 degrees. Cross-ply 16 is advanced from supply roll 22 along the cross-ply direction (arrow 32) into the cross-ply section 26 of the cross-ply machine 12 until it substantially completely covers the portion 60 of continuous ply 14 presently situated in the cross-ply section 26 of a cross-ply machine 12 with the linearly spaced array of continuous yarns 36 in between.

A clamp 62 retains a leading edge 64 of cross-ply 16 substantially contiguous with a nearside edge 66 of continuous ply 14. For example, clamp 62 is a squeegee blade spanning the width of cross-ply 16. The bar 52 of the contactor 48 is drawn over the cross-ply 16 with the brush or sponge contact promoters 50 brushing over the outer laminated thermoplastic film for gently contacting portions 60, 58 of respective the plies 14, 16 against the opposite support surface 28 of the cross-ply machine 12. The contactor 48 is thus operated for promoting contact between plies 14, 16 by gently urging the portion 58 of cross-ply 16 against the portion 60 of ply 14 and, consequently, trapping the array of yarns 36 in between opposing outer surfaces 14a, 16a of respective plies 14, 16.

When fibers 18 of continuous ply 14 are oriented along the first ply advancing direction (arrow 24) and fibers 18 of cross-ply 16 are oriented along the second cross-ply advancing direction (arrow 32) each between opposing thermoplastic films, the plies 14 and 16 of high performance fiber materials 18 are arranged in a cross-plied relationship oriented at the cross-ply angle 34 between first ply and second cross-ply advancing directions (arrows 24, 32) of plies 14, 16. The cross-ply angle 34 between first and second advancing directions (arrows 24, 32) is, for example, about 90 degrees, whereby the fibers 18 of the two plies 14, 16 are cross-plied at about 90 degrees, a 0/90 cross-plied relationship according to common usage. Optionally, the cross-ply angle 34 between first ply and second cross-ply advancing directions (arrows 24, 32) is a different angle, including but not limited to about 30 degrees, 45 degrees, or 60 degrees, etc., whereby the cross-plied relationship between the fibers 18 of the two plies 14, 16 is about 30 degrees, 45 degrees, or 60 degree, etc.

The deposits 44 of coupling agent 42 applied to the continuous yarns 36 provide a plurality of substantially continuous bonding strips 68 between continuous ply 14 and cross-ply 16 in an array along the yarns 36. The bonding strips 68 operate to couple the portions 58 of cross-ply 16 with successive portions 60 of continuous ply 14, whereby the portions 58 of cross-ply 16 is adhered to the portions 60 of continuous ply 14 sufficiently to prevent their being pulled apart. When the coupling agent 42 is a pressure sensitive adhesive, or PSA, the array of bonding strips 68 formed by the coated yarns 36 are sufficiently tacky that the relatively light pressure of brushing with the plurality of the brush or sponge contact promoters 50 of contactor 48 for coupling the portions 60, 58 of plies 14, 16 by causing cross-ply portions 58 to adhere to respective portions 60 of continuous ply 14 sufficiently to prevent their being pulled apart. This produces cross-plied material 10 with contiguous portions 58 of cross-ply 16 cross-plied with consecutive portions 60 of continuous ply 14 and having the continuous yarns 36 providing the plurality of substantially continuous bonding strips 68 (phantom lines) in between.

Alternatively, when the coupling agent 42 is a polymeric agent, the cross-ply machine 12 is adapted for the application of heat and/or pressure to the portions 60 and 58 of respective plies 14 and 16 in the cross-ply section 26, whereby by the array of bonding strips 68 formed by the coated yarns 36 is activated for coupling the portions 60 and 58 of respective plies 14 and 16.

After coupling the portions 60 and 58 of respective plies 14 and 16 with bonding strips 68, the cutter 56 is operated for cutting portions 58 of cross-ply 16 substantially along an opposite farside edge 70 of the continuous ply 14. The resulting continuous cross-plied material 10 is wound onto the take-up beam 30.

When the coupling agent 42 is a pressure sensitive adhesive, or PSA, or a polymeric agent requiring the application of pressure for bonding, the winding of continuous cross-plied material 10 onto the take-up beam 30 applies pressure to the bonding strips 68. Accordingly, the action of applying pressure for coupling the portions 60 and 58 of respective plies 14 and 16 is automatically accomplished when the assembled continuous ballistic-resistant laminate structure 10 is wound onto the take-up beam 30, as illustrated here.

Figure 3:
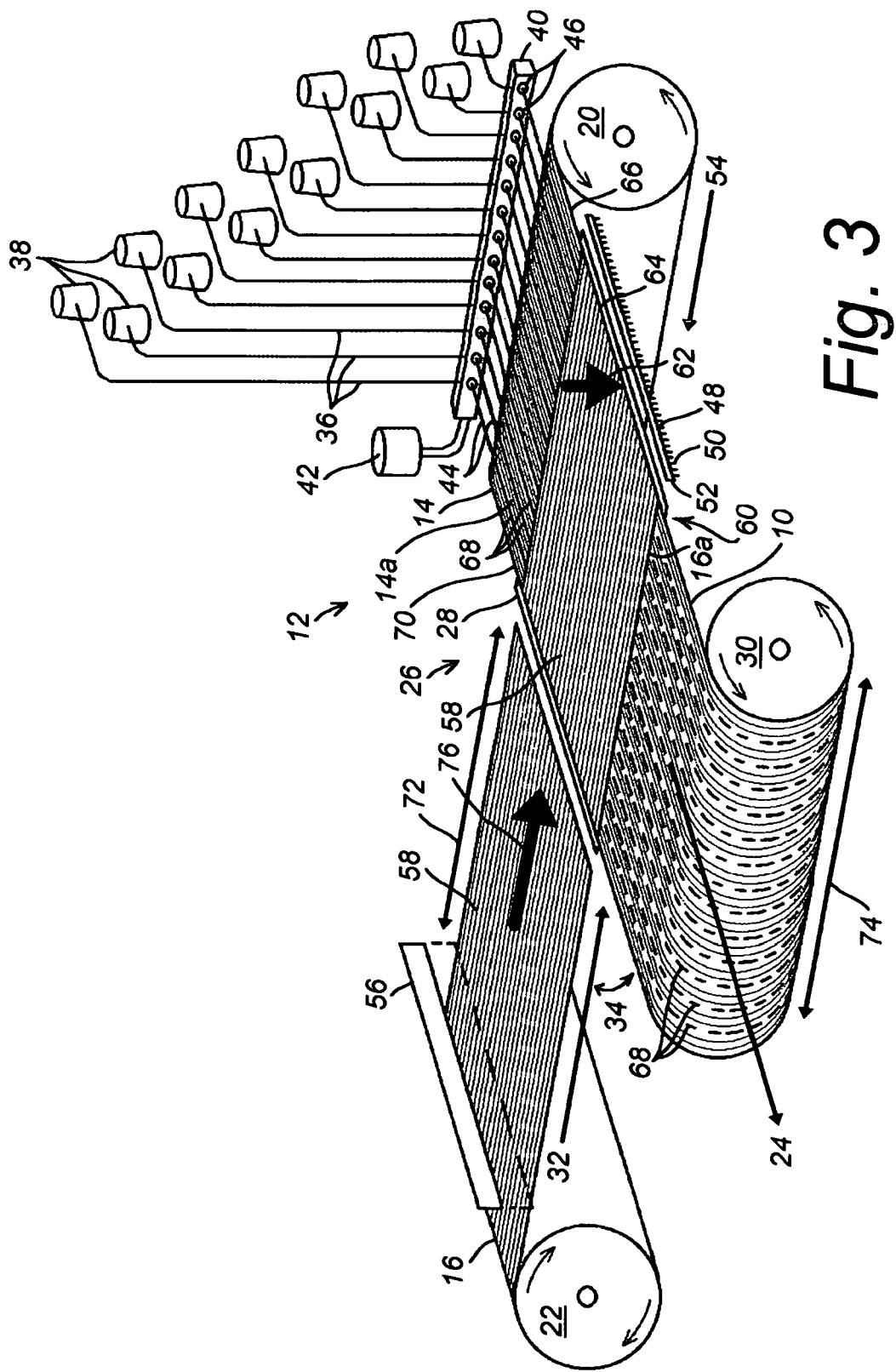
FIG. 3 illustrates an alternative embodiment of the method of the invention.

FIG. 3 illustrates an alternative embodiment wherein cutter 56 operated for cutting the portions 58 of ply 16 to a length 72 substantially equal to a width 74 of continuous ply 14 before assembling each portion 58 of cross-ply 16 with its corresponding portion 60 of continuous ply 14. The cross-ply machine 12 includes a transport mechanism 76 for individually transporting each pre-cut portion 58 of cross-ply 16 over support surface 28 in the cross-ply section 26, and over the portion 60 of continuous ply 14 with the plurality of continuous bonding strips 68 arrayed therebetween. When each ply portion 58 of cross-ply 16 is arranged in the cross-plied relationship with a corresponding ply portion 60 of continuous ply 14 as disclosed herein, coupling of the ply portion 58 of cross-ply 16 with the corresponding ply portion 60 of continuous ply 14 is accomplished as disclosed herein. Thereafter, the resulting continuous cross-plied material 10 is wound onto the take-up beam 30.

Figure 4:
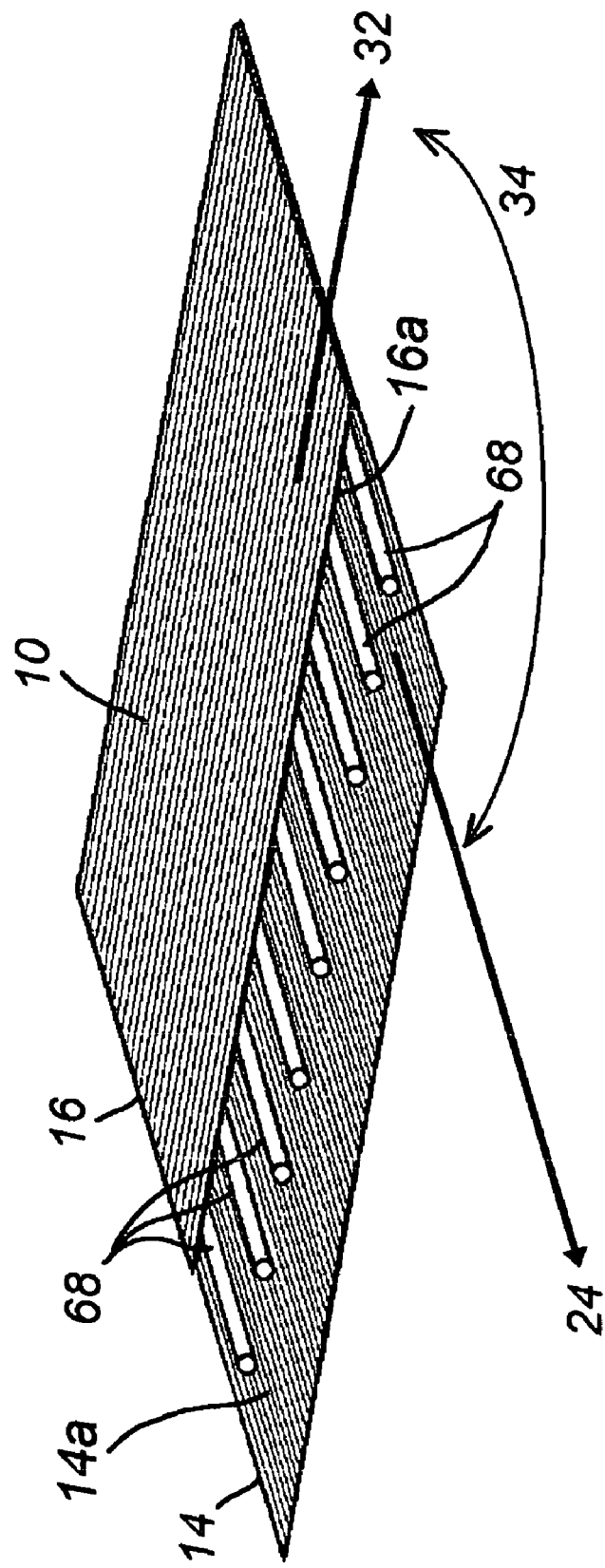
FIG. 4 illustrates the novel continuous cross-plied material resulting from the process of operating the novel automated cross-ply machine disclosed herein.

FIG. 4 illustrates the continuous cross-plied material 10 resulting from the process disclosed herein. Here, the unidirectionally-oriented bundles of high strength filaments 18 of continuous ply 14 are arrayed along the first ply advancing direction (arrow 24) and the unidirectionally-oriented bundles of high strength filaments 18 of cross-ply 16 are arrayed along the second cross-ply advancing direction (arrow 32) each laminated between opposing thermoplastic films, for example, as disclosed in U.S. patent application Ser. No. 11/986,624, the complete disclosure of which is incorporated herein by reference. When the cross-ply angle 34 between the continuous ply 14 and cross-ply 16 of high performance fiber materials is 90 degrees, the plies 14, 16 are arranged in a 0/90 cross-plied relationship according to common usage. As disclosed herein, other cross-ply angle 34 between the plies 14 and 16 are also contemplated and may substituted without departing from the spirit and scope of the invention.

Here, a portion 58 of the cross-ply 16 is cross-plied with a portion 60 of the continuous ply 14 with the plurality of continuous yarns 36 laterally spaced into a linear array corresponding to the width of continuous ply 14 along the ply advancing direction (arrow 24). The substantially continuous coatings or deposits 44 of the coupling agent 42 on the continuous yarns 36 cause the plurality of substantially continuous bonding strips 68 to be formed between the opposing outer surfaces 14a, 16a continuous ply 14 and cross-ply 16, with the continuous bonding strips 68 being laid in a laterally spaced into a linear array corresponding to the continuous yarns 36. The continuous bonding strips 68 continuously couple the cross-ply 16 with continuous ply 14, whereby continuous ply 14 and cross-ply 16 are sufficiently adhered with continuous bonding strips 68 to prevent their being pulled apart.

While the preferred and additional alternative embodiments of the invention have been illustrated and described, it will be appreciated that various changes can be made therein without departing from the spirit and scope of the invention. Accordingly, the inventor makes the following claims.

What is claimed is:

1. A cross-plied material, comprising:
   a substantially continuous ply of a fabric comprising a plurality of filaments in a substantially linear array oriented substantially along a ply advancing direction and laminated between opposing films;
   a cross-ply of a fabric comprising a plurality of filaments in a substantially linear array oriented substantially along a cross-ply advancing direction and laminated between opposing films, the cross-ply advancing direction being angularly oriented relative to the ply advancing direction; and
   a plurality of substantially continuous bonding strips adhered between opposing films of the continuous ply and the cross-ply fabrics, the bonding strips being substantially aligned along the ply advancing direction.

2. The cross-plied material of claim 1, wherein each of the bonding strips further comprises a substantially continuous yarn, and a deposit of a bonding agent thereon.

3. The cross-plied material of claim 2, wherein the bonding agent further comprises an adhesive.

4. The cross-plied material of claim 2, wherein the plurality of substantially continuous bonding strips further comprises an array of the bonding strips substantially corresponding to a width of the continuous ply and oriented substantially along the ply advancing direction.

5. The cross-plied material of claim 4, wherein the array of the bonding strips further comprises a substantially linear array.

6. The cross-plied material of claim 5, wherein the bonding strips are further substantially uniformly laterally spaced within the substantially linear array.

7. The cross-plied material of claim 2, further comprising a 0/90 cross-plied relationship between the cross-ply and continuous ply fabrics.

8. The cross-plied material of claim 3, wherein the adhesive further comprises a pressure sensitive adhesive.

9. A cross-plied material, comprising:
a substantially continuous ply of a fabric comprising a plurality of unidirectionally-oriented bundles of high strength filaments in a substantially linear array oriented substantially along a ply advancing direction and laminated between opposing films;
a plurality of cross-plies of a fabric each comprising a plurality of unidirectionally-oriented bundles of high strength filaments in a substantially linear array oriented substantially along a cross-ply advancing direction and laminated between opposing films, the cross-ply advancing direction being oriented crosswise of the ply advancing direction; and
a plurality of substantially continuous bonding strips adhered between opposing films of the continuous ply fabric and consecutive ones of the plurality of cross-plies of fabric, the bonding strips further comprising a bonding agent thereon and being substantially aligned along the ply advancing direction and laterally spaced substantially thereacross.

10. The cross-plied material of claim 9, wherein each of the bonding strips further comprises a substantially continuous yarn, and a substantially continuous deposit of the bonding agent thereon.

11. The cross-plied material of claim 10, wherein the bonding agent further comprises a pressure sensitive adhesive.

12. The cross-plied material of claim 10, further comprising a substantially linear array of the bonding strips substantially corresponding to a width of the continuous ply and oriented substantially along the ply advancing direction.

13. A cross-plied material, comprising:
a substantially continuous ply of a ballistic-resistant structure comprising a plurality of unidirectionally-oriented bundles of high strength filaments laterally spaced into a linear array substantially along a ply advancing direction and laminated between opposing thermoplastic films;
a plurality of cross-plies of a ballistic-resistant structure each comprising a plurality of unidirectionally-oriented bundles of high strength filaments laterally spaced into a linear array substantially along a cross-ply advancing direction and laminated between opposing thermoplastic films, the cross-ply advancing direction being angularly oriented relative to the ply advancing direction; and
a plurality of substantially continuous bonding strips adhered between opposing films of the continuous ply structure and consecutive ones of the plurality of cross-ply structures, the bonding strips each further comprising a bonding agent deposited thereon and being laterally spaced into a linear array substantially corresponding to a width of the continuous ply and oriented substantially along the ply advancing direction.

14. The cross-plied material of claim 13, wherein each of the bonding strips further comprises a substantially continuous yarn with a substantially continuous deposit of the bonding agent thereon.

15. The cross-plied material of claim 14, wherein the bonding agent further comprises a pressure sensitive adhesive.

16. A method of forming a cross-plied material, the method comprising:
substantially along a ply advancing direction, advancing a substantially continuous ply of a fabric comprising a plurality of unidirectionally-oriented bundles of high strength filaments in a substantially linear array oriented substantially along the ply advancing direction and laminated between opposing films;
substantially along the ply advancing direction, advancing a plurality of substantially continuous bonding strips adjacent to an outer surface of the continuous ply fabric, and further comprising depositing a bonding agent thereon and laterally spacing the bonding strips substantially across the ply of fabric;
substantially along a cross-ply advancing direction oriented crosswise of the ply advancing direction, advancing across the continuous ply fabric and the bonding strips into a position spaced away from the ply fabric with the bonding strips positioned therebetween a portion of a cross-ply of a fabric comprising a plurality of unidirectionally-oriented bundles of high strength filaments in a substantially linear array oriented substantially along the cross-ply advancing direction and laminated between opposing films; and
contacting an outer surface of the portion of cross-ply fabric with the outer surface of the continuous ply fabric with the bonding strips positioned therebetween.

17. The method of claim 16, further comprising, after the contacting, substantially along the ply advancing direction, advancing the portion of cross-ply fabric and the continuous ply fabric with the bonding strips positioned therebetween, substantially along the cross-ply advancing direction, advancing a second portion of the cross-ply fabric across the continuous ply fabric and the bonding strips into a position spaced away from the ply fabric with the bonding strips positioned therebetween and adjacent to a first portion of the cross-ply fabric; and
contacting an outer surface of the second portion of cross-ply fabric with the outer surface of the continuous ply fabric with the bonding strips positioned therebetween and having an edge of the second portion of cross-ply fabric substantially contiguous with an edge of the first portion of cross-ply fabric.

18. The method of claim 17, further comprising depositing a substantially continuous deposit of the bonding agent on each of a plurality of yarns; and
wherein advancing a plurality of substantially continuous bonding strips further comprises advancing the yarns with the bonding agent deposits thereon substantially along the ply advancing direction.

19. The method of claim 17, wherein advancing a plurality of substantially continuous bonding strips further comprises advancing the bonding strips substantially in unison with substantially continuous ply of a fabric.

20. The method of claim 16, wherein contacting an outer surface of the portion of cross-ply fabric with the outer surface of the continuous ply fabric with the bonding strips positioned therebetween further comprises urging the portion of cross-ply fabric toward the outer surface of the continuous ply fabric.

21. The method of claim 16, wherein advancing the portion of cross-ply fabric across the continuous ply fabric and the bonding strips further comprises advancing the portion of cross-ply fabric substantially along a cross-ply advancing direction oriented in a cross-ply angle between ply advancing direction of the continuous ply fabric and the cross-ply advancing direction of about ninety degrees.

* * * * *